United States Patent [19]

Pizzigoni et al.

[11] Patent Number: 5,069,811

[45] Date of Patent: Dec. 3, 1991

[54] COMPOSITIONS FOR THE SULPHATION-REMOVING CLEANING OF CARBONATIC LITHOIDAL SURFACES

[75] Inventors: Giuseppe Pizzigoni, Varese; Paolo Parrini, Novara, both of Italy

[73] Assignee: Larac S.p.A., Varese, Italy

[21] Appl. No.: 439,808

[22] Filed: Nov. 21, 1989

Related U.S. Application Data

[63] Continuation-in-part of Ser. No. 103,284, Oct. 1, 1987, abandoned.

[30] Foreign Application Priority Data

Oct. 6, 1986 [IT] Italy ............................ 21905 A/86

[51] Int. Cl.$^5$ ............................................ C11D 3/10
[52] U.S. Cl. ............................. 252/174.14; 252/523; 252/541; 252/174.25; 252/140; 252/155; 252/128; 252/129; 252/130; 252/131
[58] Field of Search ............... 252/174.14, 523, 541, 252/174.25, 140, 155, 128, 129, 130, 131

[56] References Cited

U.S. PATENT DOCUMENTS

| | | | |
|---|---|---|---|
| 3,966,432 | 6/1976 | Rayner | 252/174.25 |
| 4,431,559 | 2/1984 | Ulrich | 252/174.25 |
| 4,561,993 | 12/1985 | Choy et al. | 252/174.25 |
| 4,643,840 | 2/1987 | Brocklehurst et al. | 252/DIG. 8 |
| 4,686,064 | 8/1987 | Pizzigoni et al. | 252/541 |
| 4,686,065 | 8/1987 | Bliznik et al. | 252/174.25 |

FOREIGN PATENT DOCUMENTS 189866  6/1986  European Pat. Off. .

*Primary Examiner*—William R. Dixon, Jr.
*Assistant Examiner*—Helene Klemanski
*Attorney, Agent, or Firm*—Morgan & Finnegan

[57] ABSTRACT

Improved compositions for the sulphation-removing cleaning of lithoidal surfaces of prevailingly carbonatic nature, or of layers of such nature on different materials, comprising a mixture of an anion-exchange material (e.g., an anion-exchange resin) with an aqueous solution of ammonium carbonate and/or bicarbonate, and a filler selected from the group consisting of powders and/or fibrils of hydrophilic materials.

8 Claims, No Drawings

COMPOSITIONS FOR THE SULPHATION-REMOVING CLEANING OF CARBONATIC LITHOIDAL SURFACES

This application is a continuation-in-part of our co-pending application Ser. No. 103,284, filed Oct. 1, 1987, now abandoned.

DESCRIPTION OF THE INVENTION

1. Field of the Invention

The present invention relates to improved compositions suitable for use in carrying out the sulphation-removing cleaning of carbonatic lithoidal surfaces.

2. Background of the Invention

It is well known that the continuous and widespread use of fuels containing sulphur-containing substances, in industry, transportation, and in the household, has caused during the past decades a considerable increase in the content of polluting substances in the atmosphere, among which is sulphur dioxide ($SO_2$).

This state of things has led to a fast deterioration of many handworks exposed to the atmosphere, through already-identified mechanisms of chemical attack, such as, e.g., sulphation by $SO_2$.

Among the handworks which underwent, and are every day undergoing, the aggresivity of atmospheric pollutants, lithoidal materials are to be counted which have a prevailingly carbonatic composition, such as, e.g., marbles, sandstones, organogenic and sedimentary limestones.

The attacks generally appear as huge corrosions in the points washed away by rain, or as patinae of very variable color (even of black color), which modify considerably in the non-washed away areas, the surface appearance, the shade of color, and the reflecting power of the lithoidal materials.

The patina on the carbonatic materials is essentially constituted by calcium sulphate dihydrate ($CaSO_4.2H_2O$) generated by sulphur dioxide, which, by being considerably more soluble than the other components of lithoidal materials, is removed from the surfaces thereof by the effect of rain washing away, leaving strongly visible signs of corrosion.

Furthermore, calcium sulphate dihydrate shows a specific volume higher than that of calcium carbonate, so that its formation becomes dangerous, in particular on graven parts, and on materials having heterogeneous surfaces and mass.

One should furthermnore bear in mind that the mortars with a prevailing, or total, content of lime, widely used until not long ago both in plasters and for binding the bricks and/or of the stones in masonry works, undergo the same phenomena of atmospheric degradation as the carbonatic lithoidal materials.

It can hence be observed how masonry structures of bricks and concrete can be strikingly disfigured by patinae and crusts of sulphated material left by the evaporation of streams of desultory rain washing away, or of condensation of mists and dews.

The same danger befalls structural elements of carbonatic materials inserted in masonry structures, both of concrete and of bricks.

Another readily visible effect of the sulphation is that, which is very well-known, of the modification of the painted layer of frescoes which, if accompanied by the action of moisture, can lead to the total loss of such works of art.

The restoration of degraded lithoidal surfaces, from both the aesthetical and the functional points of view, provides for the removal of the sulphation patinae, and, in case of handworks of considerable artistic interest, it may show very delicate aspects.

Some of the most widely used restoration techniques involve abrasive actions, washes with considerable amounts of water, accompanied by brushing; furthermore, preparations are used whose action is more or less well known and controllable.

One of the cheapest and most efficacious reactants known for attacking calcium sulphate is ammonium carbonate, which is capable of reacting with said calcium sulphate to form again calcium carbonate and ammonium sulphate by the well known exchange reaction.

Unfortunately, such an action does not lead to the restoration of the initial surface of the lithoidal material, inasmuch as the calcium sulphate dihydrate has a higher specific volume than calcium carbonate, and the exchange reaction is generally accompanied by a disintegration of the sulphate layer. Furthermore, the ammonium sulphate thus formed becomes available for the resulphation of other carbonatic areas of the lithoidal materials, and hence at the end of the process the initial problem occurs again.

Methods have been proposed, e.g., in the Italian patent application No. 19,239 A/85, for the sulphation removal from lithoidal surfaces having a prevailingly carbonatic composition, without the drawbacks deriving from the formation of ammonium sulphate, by using aqueous solutions of ammonium carbonate, together with anion-exchange resin powders.

A drawback shown by these methods, however, is that in case of vertical and of jutting out or protruding surfaces, the application of the composition performing the sulphation-removing action meets with some difficulties due to the poor adhesion of the composition to the walls to be treated.

DETAILED DESCRIPTION OF THE INVENTION

It has now been discovered, in accordance with the present invention, that the above-mentioned drawbacks are overcome if to the ion-exchange material, of anionic type, having the proper granulometric characteristics, mixed with solutions of ammonium carbonate and/or bicarbonate, suitable filler materials are added.

Thus, dispersions may be obtained which have a consistency and a rheological behavior suitable for being applied by means of conventional spray-delivery devices, such as, e.g., those used in the application of plastic plasters, or also the classic manual or mechanical equipment, such as, e.g., spatulas, trowels, darbies, etc.

The so-obtained formulations result in a statically stable form when applied to vertical and jutting-out surfaces, and in a perfectly measurable predetermined amount at any point of application relative to the sulphated layer to be removed, to its thickness, to its compactness, and to the nature of the underlying lithoidal layer or substrate.

The object of the present invention is therefore an improved composition suitable for use as a sulphation-removing agent from lithoidal surfaces of prevailingly carbonatic nature, or of layers of the same nature deposited on different materials, comprising a mixture of water or of an aqueous solution of ammonium carbonate and/or bicarbonate with an anion-exchange material and a filler selected from the group consisting of powder and/or fibrils of hydrophilic materials.

A further object of the present invention is the use of such compositions in the process of the sulphation-removing cleaning of lithoidal surfaces, or of layers as defined above.

The anion-exchange material may have its functional groups salified, or, preferably, in the activated state, e.g., in the form of aminic groups or of quaternary ammonium bases, not salified.

Examples of suitable anion-exchange materials are the synthetic anion-exchange resins, provided with basic functional groups, and in particular resins with a matrix based on polymers of styrene, of acrylic monomers, or on polycondensation resins.

A fine granulometry of the anion-exchange material is useful for the preparation of wet pastes endowed with good characteristics of spreadability, capable of adhering to and penetrating all of the surface roughnesses of the lithoidal materials, as well as of supplying a mass endowed with an immediate and strong power of fixing the sulphate ions released by ammonium carbonate.

Preferably, the particles of the exchange material shall have dimensions smaller than 0.1 mm.

The filler materials which have been shown to be suitable and useful for preparing the compositions of the present invention are powders of hydrophilic materials, of both organic and inorganic nature, compatible with anion-exchange materials, and with the lithoidal surfaces to be treated. They may be selected from:

powders of argillaceous materials, kaolinites, bentonites, attapulgites, fossile meals, carbonatic materials, etc.;

powders of materials of vegetable origin of prevailingly fibrous nature, wood, natural cellulose, such as suitable dewaxed linters or cotton, chemical-pulp celluloses, regenerated cellulose, etc.; and powders of gelling agents, of the type of the amorphous silicas, or the like.

The above list is supplied for exemplifying purposes only, and is not intended to be limitative, inasmuch as the commercial availability of the products mentioned, or of similar materials, and the possibility of preparing blends thereof, is very wide as will be readily appreciated by those skilled in the art.

The weight ratio between the anion-exchange material and the ammonium salt solution or water is not critical for the application. Generally, the limits of such ratio are dictated by the need for the compositions of the invention to be obtained in the form of a paste which is sufficiently thick and adhesive for the surfaces to be treated. Generally, the weight ratio of the anion-exchange material to the ammonium carbonate and/or bicarbonate solution or to water is within the range of from about 0.6 to 4, and preferably from 1 to 2.

Suitable values of concentration of the solutions of ammonium carbonate and/or bicarbonate are those within the range of from 5 to 25% by weight, but this does not constitute a limitation. Such concentrations may be varied by means of simple stoichiometric evaluations on the basis of the degree of sulphation of the particular surface to be treated.

The most useful concentrations are those around 10%, in that they are the most quickly obtainable concentrations.

The most suitable amounts of the filler materials are generally a function of their size and morphologic characteristics, and of the application needs. For example, filler amounts generally lower than, or equal to, 70% by weight relative to the total weight of the dry mixture may be used, even if using amounts within the range of from 2 to 50% or of from 20 to 50% may sometimes be more preferable, in that the efficacy of the preparation depends upon its active components: the anion-exchange material and ammonium carbonate, which are to be applied in an amount proportional to the layer of sulphation to be removed.

Some rheological and applicative characteristics of the compositions of the present invention may be obtained by using a combination of fillers different from each other. The selection of the most suitable types will depend upon the needs and the technical-economic requirements of the operation, the nature of the surfaces to be treated, and their historical-artistic interest. As an indication, optimum compositions for application by spreading may be obtained both by using small amounts of fibrous materials, such as, e.g., a cellulose powder with fibrils having a medium-high length of from 200 to 1000 micrometers, both by using argillaceous materials, such as e.g., attapulgite, with particles of less than 150 micrometers in size. Optimum compositions for spray-application, by one or two coats, and with the desired and necessary amounts being deposited, may be obtained by using amounts of from 20 to 50% of blends of cellulose powders, with the lengths of the fibrils, short fibrils and average fibrils, generally being from 30 to 200 micrometers and being suitably balanced relative to the characteristics of the delivery means available, or to be used.

In general, the size of the filler used for preparing the compositions of the present invention, whether in powder form or in fibril form, is within the range of from 10 to 1,500 micrometers.

Manual application of the present compositions makes it possible to apply layers with a content of active substances within the range of from less than 100 g/m$^2$ up to more than 1,000 g/m$^2$ and preferably of from 100 to 1000 g/m$^2$, in a very easy way, on surfaces oriented in whatever way they may be.

The application of the compositions by means of spray delivery means makes it possible, e.g., to easily apply one or more coats of the composition on vertical surfaces and jutting out surfaces, on worked or carved parts, to form layers of from about 150 to more than 500 g/m$^2$ of dry weight, with it being possible for the operator to proportion the active materials to the actual extent of the sulphated layer to be removed. Furthermore, the considerable ease of metering the formulation makes it possible to progressively remove the suplhation layers, such a progressive removal being useful in order not to endanger the integrity of the underlying portion of artistic and aesthetic interest.

The fillers of hydrophilic nature, whether of fibrous nature or not, such as those mentioned, when added to the compositions according to suitable procedures and amounts, make it possible to modify the rheological behavior of a concentrated dispersion of a powder of an ion-exchange material from tendentially dilatant to pseudoplastic, plastic and thixotropic, accordingly to the requirements of use. This makes it also possible for further advantages to be achieved, besides the advantage that the composition may be applied by means of a wide range of delivery means; among said further advantages, may be mentioned the possibility the operator is given to make the composition of the present invention function with large amounts of water, an essential requisite for extending the desulphating ion-exchange action over time.

Further additives useful for preparing the present compositions are compounds endowed with surface-active properties which facilitate the wetting of the fillers. They are selected from the non-ionic or cationic surfactants which are compatible with the ion-exchange material, such as the alkyl-phenols and alkyl-ethoxylates, or quaternary ammonium salts and ethoxylated derivatives of amines.

Other compounds which may be used as regulators of evaporation of the aqueous phase, or flexibilizers of the cellulosic materials, are the polyalcohols, such as ethylene glycol, di-ethylene glycol and tri-ethylene glycol, glycerol, and still others. A preferred such compound is glycerol, in that it is an optimum solvent for calcium sulphate.

The compositions of the present invention, after application, may be made to act under free-evaporation, delayed-evaporation, or practically inhibited-evaporation conditions, by making sheets of, e.g., polyethylene suitably adhere to the still moist layer that has been treated.

After a treatment period regarded as being long enough, the exhausted paste may be easily removed either by a dry removal procedure, or by a wet removal procedure, however without any need for strong mechanical actions, and the treated surface is washed by sponging, or by low-pressure water jets.

If the treatment has been properly carried out and proportioned, in most cases only one application of the composition is needed.

Further applications in areas less easy to be treated are always possible, in that the compositions of the present invention are highly specific for the removal of the layers of sulphation only, and do not show any aggressive action towards other components of the treated surfaces, unless they have a gypsum basis; furthermore, the compositions do not show abrasive characteristics.

EXAMPLES

For a still better understanding the present invention, here follow some illustrative, but non-limitative examples:

EXAMPLE 1

A preparation obtained by kneading on a mixer, and consisting of: 50 parts by weight of a powdered ion-exchange resin, of non-salified, strong anionic type, KASTEL ® A500N, with more than 85% of its weight being constituted by a fraction finer than 0.1 mm;

50 parts by weight of dewaxed cotton linters powder, with fibrils having an average length of about 50 micrometers;

83 parts by weight of a solution of ammonium carbonate at 15%, to which 0.5% of trimethyl-benzyl-ammonium chloride and 1% of glycerol were added; and 167 parts by weight of water, gradually added until the desired consistency is reached, was applied by means of a small compressed-air spraying equipment, to a jutting out surface of a travertine cornice, 30 cm wide, displaying very showy phenomena of sulphation throughout its length, over a surface area of approximately 400 cm$^2$, by two coats, with a total deposited amount of 300 g/m$^2$, dry weight.

After 5 hours of drying, the exhausted paste was removed by means of a plastic putty knife, and the treated surface was washed with water and a sponge, a cleaned area being so evidenced, notwithstanding a residual sulphation of about 13 g of $SO_4^=/m^2$. After the analysis of the sulphur content of the exhausted paste, the initial sulphation degree was estimated to be around 50 g of $SO_4^=/m^2$.

EXAMPLE 2

A preparation obtained in a mixer by adding, with mild stirring, to 330 parts by weight of a solution at 6.4% of ammonium carbonate, to which 0.2% of benzyl-trimethyl-ammonium chloride and 0.5% of glycerol were added, the following:

70 parts by weight of an ion-exchange resin powder, of non-salified strong anionic type as in Example 1, with more than 85% of its weight of a fraction finer than 0.1 mm; and 60 parts by weight of a powder of dewaxed cotton linters, with an average length of the fibrils of approximately 50 micrometers, was applied by means of a small compressed-air spraying equipment, to the jutting out surface of a travertine cornice, of about 400 cm$^2$, with values of sulphation of from 47 to 53 g of $SO_4^=/m^2$.

The application was carried out by two coats, to a total deposited amount of 333 g/m$^2$, dry weight, and evaporation was delayed by means of polyethylene sheets applied to adhere to the coating soon after the second spraying. After 22 hours of action, the paste was removed and the surface under it was washed by means of water-sponging. It showed a good degree of cleaning with a residual sulphation of about 9.3 g of $SO_4^=/m^2$, absolutely invisible to the naked eye.

EXAMPLE 3

A preparation obtained in a mixer by adding, with mild stirring, to 200 parts by weight of a solution at 7.5% of ammonium carbonate, to which 0.25% of benzyl-trimethyl-ammonium chloride and 0.5% of glycerol were added, the following:

96 parts by weight of an ion-exchange resin powder, of non-salified strong anionic type as in Example 1, with more than 85% of its weight being constituted by a fraction finer than 0.1 mm; and 24 parts by weight of a powder of dewaxed cotton linters, having an average length of the fibrils of approximately 50 micrometers, was applied by means of a small compressed-air spraying equipment, to a jutting out surface of a travertine cornice of about 400 cm$^2$, with values of sulphation of 59 g of $SO_4^=/m^2$.

The application was carried out by two coats, to a total deposited amount of 437 g/m$^2$, dry weight, and evaporation was delayed by means of polyethylene sheets applied to adhere to the coating soon after the second spraying. After 22 hours of action, the paste was removed and the surface under it was washed by means of water sponging. It showed a good degree of cleaning with residual sulphation practically absent.

EXAMPLE 4

A preparation obtained in a small mixer by adding, with mild stirring, to 260 parts by weight of a solution of ammonium carbonate at 8%, to which 0.25% of benzyl-trimethylammonium chloride and 0.5% of glycerol were added, the following:

80 parts by weight of ion-exchange resin powder, of non-salified strong anionic type as in Example 1, with more than 85% of its weight being constituted by a fraction finer than 0.1 mm, premixed with 6 parts by weight of ARBOCEL® BWW40, 20 parts by weight of ARBOCEL BE600, and 13 parts by weight of ARBOCEL BE600/30, which are cellulose powders by J. RETTENMAIER und SOHNE of Holzmühle über Ellwangen (Federal Republic of Germany), having a size decreasing from 200 to 30 micrometers, was applied by means of a small compressed-air spraying equipment, to a jutting out surface of a travertine cornice, of about 400 cm$^2$, with values of sulphation of approximately 45 g of $SO_4^=/m^2$.

The application was carried out by two coats, to a total deposited amount of 416 g/m$^2$, dry weight, and evaporation was delayed by means of polyethylene sheets adhering to the same deposit. After 15 hours of action, the paste was removed and the surface under it was washed by means of sponging and delicate water jets. The surface looked considerably clean, with an insignificant degree of residual sulphation.

EXAMPLE 5

A preparation obtained in a mixer by adding, with mild stirring, to 100 parts by weight of an ion-exchange resin powder, of non-salified strong anionic type as in Example 1, with a size lower than 0.1 mm; the following:

10 parts by weight of ARBOCEL® DC1000 (a cellulose powder with fibrils having an average length of 700 micrometers, and 180 parts by weight of a solution of ammonium carbonate at 10%, to which benzyl-trimethyl-ammonium chloride and glycerol were added, was easily applied by means of a putty knife and a trowel to vertical jutting out surfaces of limestone of about 300 cm$^2$, visibly sulphated (more than 50 g of $SO_4^=/m^2$).

The preparation was made to act on the sulphated surface for approximately 20 hours, while being protected from evaporation by means of polyethylene sheets, after which it was removed by means of putty knives made of a plastic material.

The treated surfaces were washed with water with a considerable degree of cleanliness, and the resulting removal of sulphation being clearly evidenced.

EXAMPLE 6

A paste obtained in a small mixer by adding, with mild stirring, to 450 parts by weight of a solution of ammonium carbonate at 7.5%, the following:

75 parts by weight of a weak anion-exchange, KASTEL® A101, in the form of a fine powder, with more than 90% of it being finer than 0.053 mm, and 75 parts by weight of ATTAPULGUS CLAY 100/up by ENGHELHARD, Florida, U.S.A., which is an attapulgite finer than 150 micrometers, was applied by means of a putty knife, and by brushing, after the addition of a little water, to parts of a limestone surface of about 300 cm$^2$, visibly sulphated (more than 50 g of $SO_4^=/m^2$).

The applied layers had a wet thickness of the order of 2-3 mm, and the deposited dry amount was about 800 g/m$^2$; they were made to act under free-evaporation conditions for about 24 hours, after which they were easily removed by means of putty knives made of a plastic material.

The treated surfaces, after washing by water-sponging, came out completely clean, with only insignificant levels of residual sulphation.

EXAMPLE 7

A preparation obtained in a mixer by adding, with mild stirring, to demineralized water, 50%, w/w, the following:

an anion exchange resin powder of a non-salified strong type, with more than ⅔ of its weight between 0.10 and 0.50 mm, 46%, w/w.

cellulose powder, ARBOCEL BE600/30®, mixed in advance with the anion exchange resin powder, 3%, w;w, attapulgite finer than 150 micrometers, ATTAPULGUS CLAY 100/UP, also mixed in advance, 1%, w/w, was applied, by means of putty knives and brushing, on the ornaments of marble surfaces of some carved (and therefore having vertical and jutting surfaces) Roman sarcophagi of different ages.

The surfaces were visibly blackened and sulphated, with more than 20 g of sulphate ion/sq.m.

The applied layers had a wet mean thickness of about 4 mm. These were made to act for widely variable periods of time, depending on the requirements of the restoration work.

The maximum time did not exceed 24 hours, after which the applied layers were easily and gently removed. The treated surfaces, after washing by water-sponging, come out cleaned, according to the specific observations of the supervisor, and with only insignificant levels of residual sulphation.

EXAMPLE 8

A preparation obtained in a mixer by adding, with mild stirring, to demineralized water, 60%, w/w, the following:

an anion exchange resin powder of a non-salified strong type, with more than 2/5 of its weight finer than 0.1 mm, 38%, w/w, kaolin powder, paper grade, KAOGLOSS® from Theele Kaolin Co., Sandersville, Ga., U.S.A., mixed in advance with an anion exchange resin, 2%, w/w, was applied by brushing, on the delicate and precious carved surfaces of apuanic marble decorating a sarcophagus of porphyroid stones, visibly blackened and slightly sulphated (3-6 g of sulpahate ion/sq.m) because located in a church since from 1400 A.D.

The applied layer had a wet thickness of about 2 mm and was made to act until dry (some hours). Then the applied layer was removed by brushing and vacuum cleaning.

The treated surfaces turned out to be well cleaned, with no residual sulphation, according to the specific observation of the supervisor.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Improved composition for the sulphation-removing cleaning of lithoidal surfaces of prevailing carbonatic nature, or of layers of the same nature deposited on different materials, comprising an active mixture of water or of an aqueous solution of ammonium carbonate, ammonium bicarbonate or mixtures thereof, with an anion-exchange material and a filler in an amount from 2 to 70% by weight being selected from the group consisting of powders and fibrils of hydrophilic materials whereby the composition has a rheological behavior which is pseudoplastic, plastic and thixotropic.

2. Compositions according to claim 1, wherein the weight ratio of the anion-exchange material to the aqueous solution of ammonium carbonate and/or bicarbonate or to water varies within the range of from 0.6 to 4.

3. Compositions according to claim 2, wherein the said weight ratio is within the range of from 1 to 2.

4. Compositions according to claim 1 or 2 or 3, in the anion-exchange material is a synthetic anion-exchange resin.

5. Compositions according to claim 1 or 2 or 3, wherein the powders of hydrophilic materials are selected from the group consisting of:
   powders of argillaceous materials, kaolinites, bentonites, attapulgites, fossil meals, carbonatic materials;
   powders of materials of vegetable origin of prevailingly fibrous nature, wood, natural cellulose, dewaxed linters or cotton, cellulose from chemical pulp, regenerated celluloses; and
   powders of amorphous silicas.

6. Compositions according to claim 1 or 2 or 3, wherein the filler is used in an amount from 2 to 50% by weight, relative to the total amount of the dry mixture.

7. Compositions according to claim 1 or 2 or 3, wherein the filler is selected from powders or fibrils having dimensions within the range of from 10 to 1,500 micrometers.

8. Method for the sulphation-removing cleaning of lithoidal surfaces having a prevailingly carbonatic composition, or of layers having such a composition on different materials, comprising applying to such surfaces a composition as defined in claim 1 or 2 or 3, in amounts within the range of from less than 100 up to more than 1,000 g./m$^2$ of active substance.

* * * * *